(12) United States Patent
Ratza et al.

(10) Patent No.: US 6,474,738 B1
(45) Date of Patent: Nov. 5, 2002

(54) FLIP-UP BOLSTER CHAIR

(75) Inventors: Clifton J. Ratza; Trent A. Eekhoff, both of Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/885,581

(22) Filed: Jun. 20, 2001

(51) Int. Cl.$^7$ ................................................. A47C 7/02
(52) U.S. Cl. ...................................... 297/337; 297/237
(58) Field of Search ........................... 297/183.3, 183.4, 297/233, 234, 237, 256.15, 337, 487, 488, 250.1

(56) References Cited

U.S. PATENT DOCUMENTS

| | | | |
|---|---|---|---|
| 3,222,106 A | | 12/1965 | Stout |
| 3,279,850 A | | 10/1966 | Saemann et al. |
| 3,442,552 A | | 5/1969 | Lehner |
| 3,819,230 A | * | 6/1974 | Bloom .................. 297/256.15 |
| 3,924,891 A | | 12/1975 | Williams |
| 4,787,675 A | | 11/1988 | McLeod |
| 4,934,303 A | | 6/1990 | Lathers et al. |
| 5,265,934 A | * | 11/1993 | Forget ......................... 297/237 |
| 5,364,151 A | | 11/1994 | Yurasits |
| 5,427,432 A | * | 6/1995 | Meeker et al. ......... 297/256.15 |
| 5,619,949 A | | 4/1997 | Dick, Jr. |
| 5,833,314 A | * | 11/1998 | Mitschelen et al. ......... 297/237 |
| RE36,230 E | | 6/1999 | Gezari et al. |
| 6,056,359 A | | 5/2000 | Clark ......................... 297/237 |
| 6,068,335 A | * | 5/2000 | Glover .................. 297/256.15 |

* cited by examiner

*Primary Examiner*—Peter R. Brown
(74) *Attorney, Agent, or Firm*—Price, Heneveld, Cooper, DeWitt & Litton

(57) ABSTRACT

A chair assembly includes a seat shell that includes a seat section adapted to support a user thereon and a back section extending upwardly from the seat section. The seat shell further includes a pair of first coupler portions, and a bolster having a support section and first and second arm sections juxtaposed across the support section. Each arm section of the bolster includes a second coupler portion matable with the first coupler portions. The first coupler portions and second coupler portions couple with one another to allow the bolster to be rotated between a first position, wherein the support section of the bolster is at a first height relative to the seat section of the seat shell, and a second position, wherein the support section of the bolster is at a second height relative to the seat section of the seat shell and that is above the first height.

43 Claims, 5 Drawing Sheets

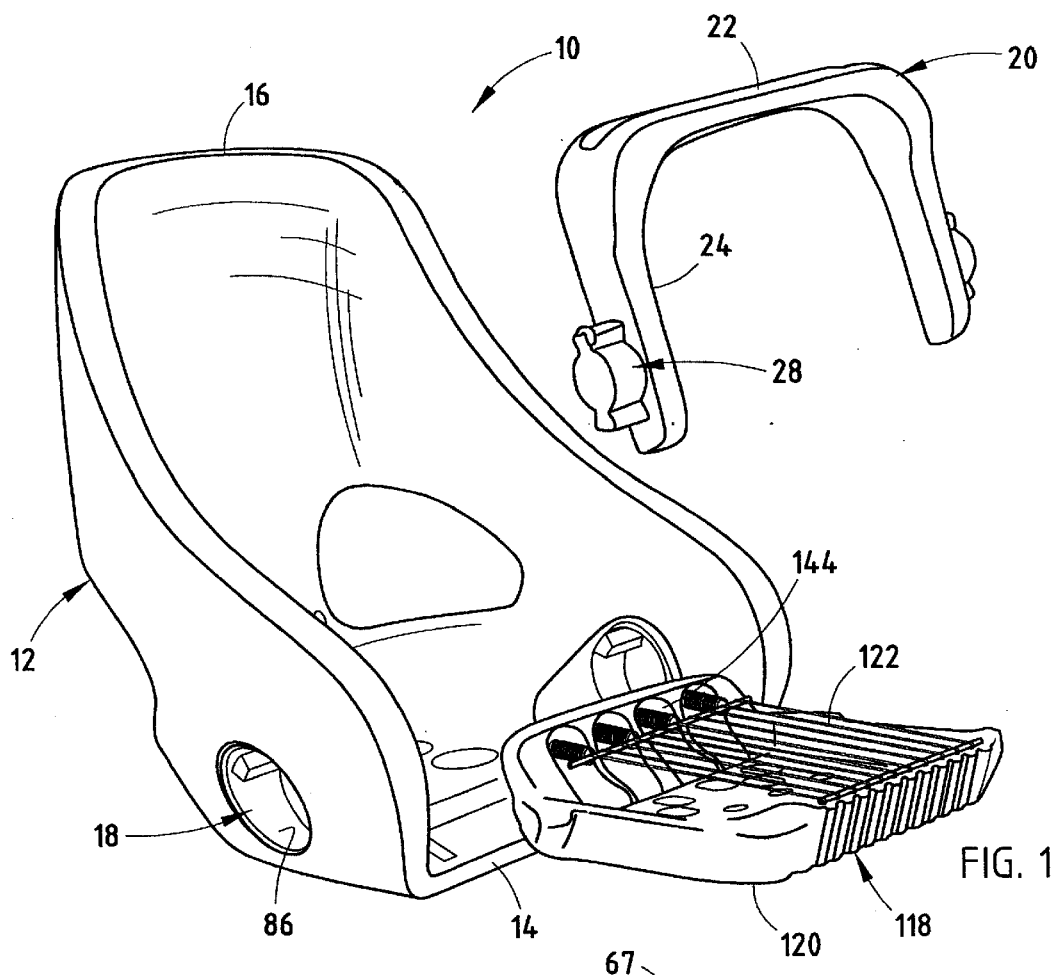
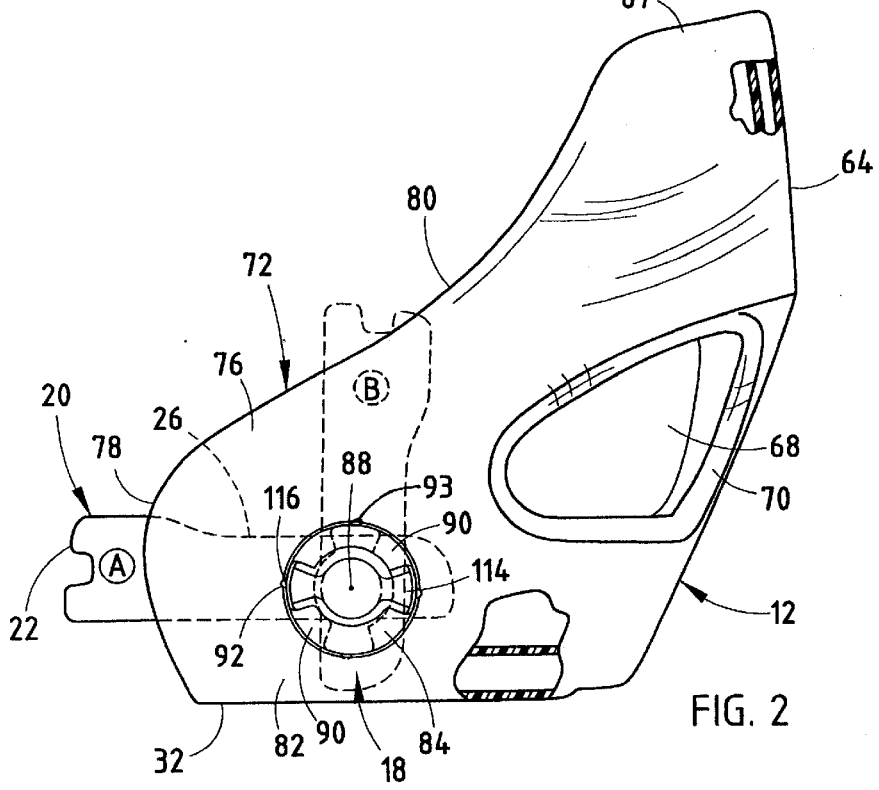
FIG. 1
FIG. 2

FLIP-UP BOLSTER CHAIR

BACKGROUND OF THE INVENTION

The present invention relates to outdoor seating and the like, and in particular to a bolster seat for use in recreational boats, and other similar applications.

Recreational boating has prompted the need for many configurations and styles of boat seating. A particular arrangement which has developed is that of a bolster-style seat. This style of seating usually includes a bolster that is movable between a lowered position and raised position, wherein the user is provided additional space between the chair and the controls of an associated recreational boat within which to stand. Quite often, this type of seating arrangement is used in conjunction with a pedestal attachment, thus allowing the user to be elevated well above the deck of the boat.

To be suitable for such outdoor applications, the seat must be sufficiently sturdy to withstand forces acting on the seat, and rigid enough to prevent warping of the seat. Yet the seat should be constructed to be lightweight, and allow for economical manufacturing. In addition, the manufacturing and assembly of components for prior bolster seating arrangements has typically been rather expensive. In addition, some bolster-style outdoor seats include numerous components and mechanisms with which to attach the bolster to the associated chair, thereby further increasing the complexity and costs associated with manufacturing and assembly.

SUMMARY OF THE INVENTION

One aspect of the present invention is to provide a chair assembly for use in a recreational boat and the like, comprising a seat shell including a seat section adapted to support a user thereon and a back section extending upwardly from the seat section, the seat shell further comprising a pair of first coupler portions and a bolster that includes a support section, a first arm section and a second arm section, wherein the first and second arm sections are juxtaposed across the support section and include second coupler portions matable with the first coupler portions. The first coupler portions and the second coupler portions couple with one another, thereby allowing the bolster to be rotated between a first position, wherein the support section of the bolster is at a first height relative to the seat section of the seat shell, and a second position, wherein the support section of the bolster is at a second height relative to the seat section of the seat shell and is above the first height.

Another aspect of the present invention is to provide a chair assembly, comprising a seat shell including a substantially hollow seat section adapted to support a user thereon and a substantially hollow back section extending upwardly from the seat section, wherein the seat shell includes a first coupler portion. The chair assembly further comprises a bolster that includes a substantially hollow support section, a pair of substantially hollow arms and a second coupler portion coupled to the first coupler portion. The bolster is rotatable between a first position, wherein the support section of the bolster is at a first height relative to the seat section of the seat shell, and the second position, wherein the support section of the bolster is at a second height relative to the seat section of the seat shell and is above the first height.

Yet another aspect of the present invention is to provide a method for constructing a chair, comprising providing a seat shell that includes a seat section, a back section extending upwardly therefrom and a pair of first coupler portions, and providing a bolster that includes a support section and a pair of longitudinally flexible supporting arms, wherein each supporting arm includes a second coupler portion that define a distance therebetween. The method also includes placing a flexure force on the supporting arms, thereby elastically deforming the supporting arms and decreasing the distance between the second coupler portions, aligning the first and second coupler portions, and releasing the flexure force on the supporting arms, thereby allowing the first and second coupler portions to positively engage such that the bolster is rotatable between a first position, wherein the support section of the bolster is at a first height relative to the seat section of the seat shell, and a second position wherein the support section of the bolster is at a second height relative to the seat section of the seat shell and is above the first height.

The present inventive chair assembly and related method for construction provide a bolster-type outdoor seat for recreational boats and other similar applications, which is very durable to withstand outdoor applications, and also comfortable to use. Preferably, the bolster chair has a hollow molded construction which provides a seat that is both very lightweight and extremely rigid. Integrally formed couplers provide a strong rotatable interconnection between the bolster and associated seat, that is economical to manufacture and easy to assemble. Preferably, a stop is provided which restricts the range of movement of the bolster to between the first position and second position. The bolster chair also has an uncomplicated design that results in reduced manufacturing and assembling costs, is efficient in use, and is particularly well adapted for the proposed use.

These and other features, advantages and objects of the present invention will be further understood and appreciated by those skilled in the art by reference to the following specification, claims and appended drawings.

BRIEF DESCRIPTION OF THE DRAWINGS

FIG. 1 is an exploded perspective view of a chair assembly embodying the present invention;

FIG. 2 is a side view of the chair assembly cut-away to show an interior thereof, and wherein a bolster is shown in a down position and an up position in phantom;

DETAILED DESCRIPTION OF THE PREFERRED EMBODIMENTS

Figure 3:
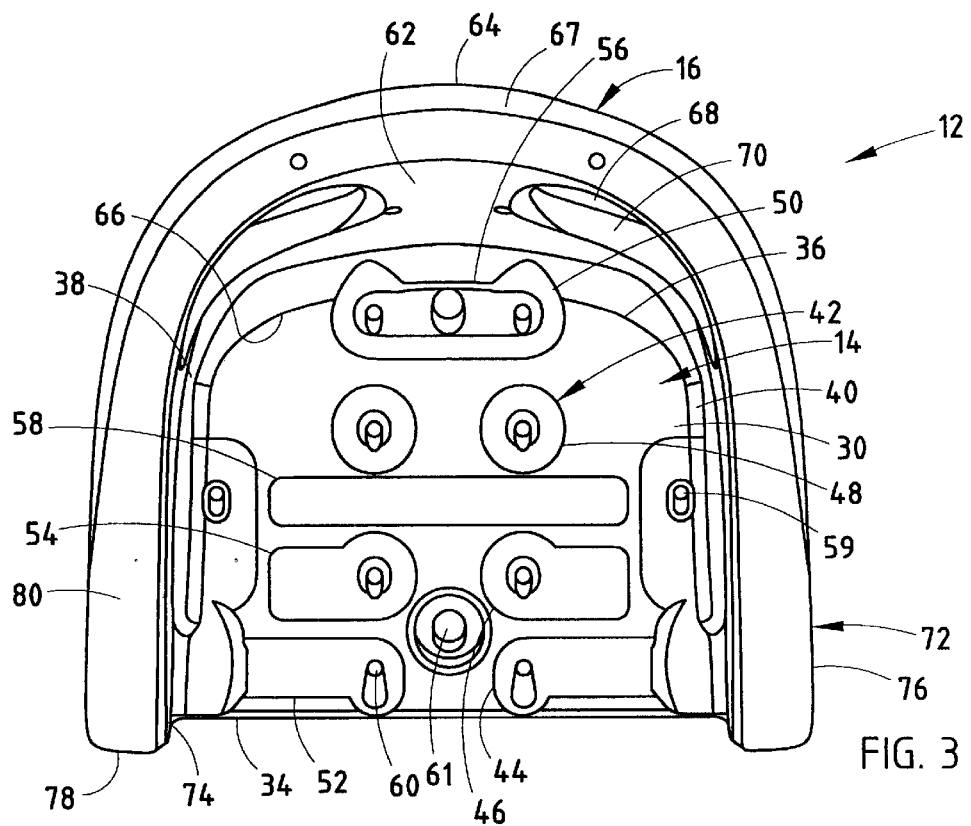
FIG. 3 is a top plan view of a seat shell.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a chair assembly embodying the present invention. In the illustrated example, chair assembly 10 includes a substantially planar seat shell 12 that includes a seat section 14 and a curved back section 16 extending upwardly from seat section 14. Seat shell 12 further includes a pair of first coupler portions 18. Chair assembly 10 also includes a bolster 20 that includes a support section 22, a first arm section 24 and a second arm section 26. First arm section 24 and second arm section 26 are juxtaposed across support section 22 of bolster 20 and extend substantially orthogonally to support section 22. First arm section 24 and second arm section 26 each include a second coupler portion 28 that are matable with first coupler portions 18. First coupler portions 18 and second coupler portions 28 are coupled with one another, thereby allowing bolster 20 to be rotated between a first position A (FIG. 2), wherein support section 22 is at a first height relative to the seat section 14 of seat shell 12, and a raised position B, wherein support section 22 of bolster 20 is at a second position relative to the seat section 14 of seat shell 12 and that is above the first height of first position A.

Figure 4:
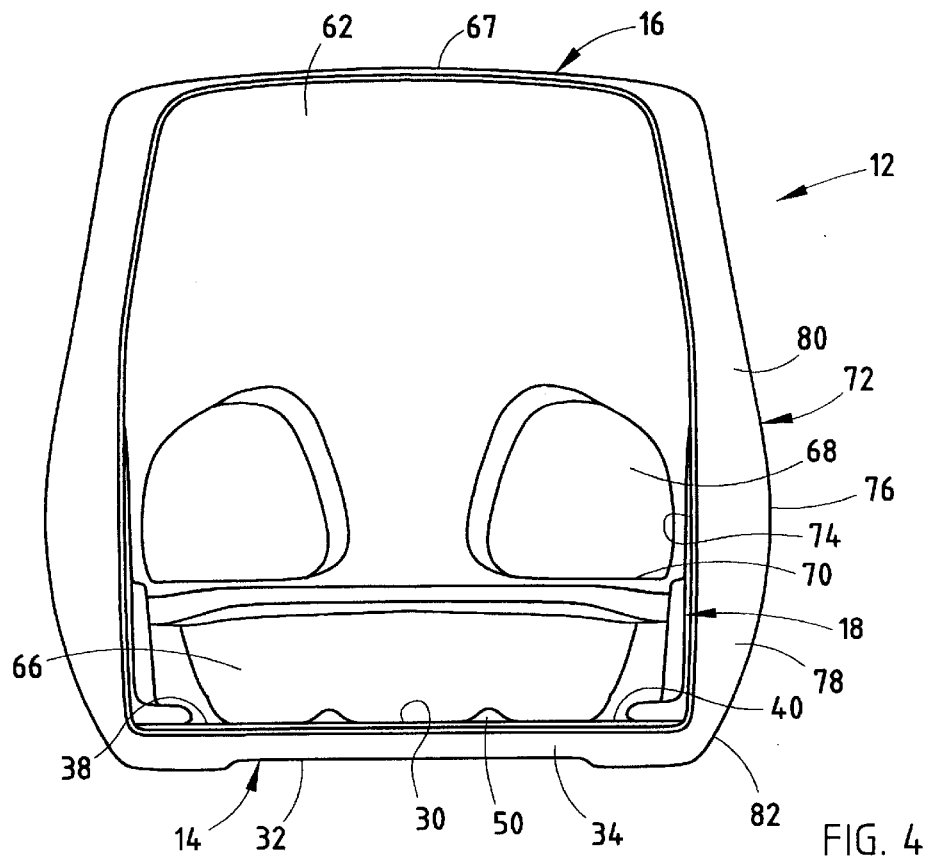
FIG. 4 is a front view of the seat shell.

Seat section 14 of seat shell 12 (FIGS. 2–4) is defined by an upper surface 30, a lower surface 32, a front edge 34, a rear side 36, a left side 38 and a right side 40. Seat section 14 is provided with a plurality of structural reinforcement recesses 42 that extend from upper surface 30 to lower surface 32. Specifically, four pairs of recesses 32 are spaced longitudinally along seat section 14 and include a first pair 44, a second pair 46, a third pair 48 and a fourth pair 50. The first pair 44 of recesses 42 each include a recessed channel section 52 that extends between upper surface 30 and lower surface 32 and laterally towards left and right sides 38 and 40, respectively. The second pair 46 of recesses 42 each include a recessed channel section 54 that extends between upper surface 30 and lower surface 32 and laterally towards left and right sides 38 and 40, respectively. The fourth pair 50 of recesses 42 include a recessed channel section 56 that extends between the associated recesses 42 and between upper surface 30 and lower surface 32. Seat section 14 further includes a recessed channel section 58 that extends between upper surface 30 and lower surface 32 and laterally across seat section 14, and is located between second pair 46 and third pair 48 of recesses 42. The recesses 42, associated channel sections 52, 54 and 56 and channel section 58 provide seat section 14 structural rigidity against longitudinal and lateral warping as well as "oil canning." Each recess 42 is provided with an aperture 60 concentrically located therein. Each aperture 60 is adapted to receive mounting hardware therethrough as described below.

Seat section 14 is further provided with a pair of water drain holes 59 extending from upper surface 30 to lower surface 32 of seat section 14. Drain holes 59 are positioned so as to allow water or other liquids which collect on upper surface 30 to drain through seat section 14.

Seat section 14 of seat shell 12 is further provided with a pair of pressure equalization holes 61 located approximate front edge 34 and rear side 36 of seat section 14 and extending from upper surface 30 and to lower surface 32 of seat section 14. The utility of pressure equalization holes 61 is described below.

The back section 16 of seat shell 12 is defined by a forward surface 62, a rearward surface 64 and a lower side 66 integrally molded with rear side 36 of seat section 14. Forward surface 62 of back section 16 is provided with a concave shape to abut the back area of a seated user, thereby providing improved comfort. Back section 16 includes a pair of apertures juxtaposed laterally across back section 16. Each aperture 68 extends between forward surface 62 and rearward surface 64 of back section 16 thereby defining a wall 70. The walls 70 provide back section 16 with structural rigidity against longitudinal and lateral warping, as well as oil canning.

The seat shell 12 is further provided with a pair of arms 72 that are defined by an inner surface 74, an outer surface 76, a forwardly facing front edge 78, an upwardly facing top edge 80 and a bottom side 82 integrally molded with left and right sides 38 and 40 of seat section 14, respectively. Front edge 78 of each arm 72 is provided with a forwardly facing convex shape, while top edge 80 of each arm 72 is provided with a downwardly extending convex shape. Seat shell 12 is formed such that front edge 78 of each arm 72 blends evenly into top edge 80 of each arm 72, which in turn blends evenly into top edge 67 of back section 16.

The illustrated seat shell 12, including seat section 14, back section 16 and arms 72, are constructed from plastic or a material exhibiting similar properties. Seat shell 12 is preferably formed through a rotocast process, and has substantially uniformed wall thickness. Although a rotocast process is preferred, it is foreseeable that any suitable method for hollow molding may be utilized.

Each arm 72 includes one of the first coupler portions 18. Each first coupler portion 18 includes an aperture 84 that extends through the associated arm 72 and defined by a bearing surface 86 and defining a pivot point 88. Each first coupler portion 18 further includes a pair of first stops 90 extending radially inward from bearing surface 86 of each aperture 84 and juxtaposed across pivot point 88. Each first coupler portion 18 further includes a pair of laterally extending first notches 92 and a pair of laterally extending second notches 93 that extend radially outward into bearing surface 86 of each aperture 84.

Figure 5:
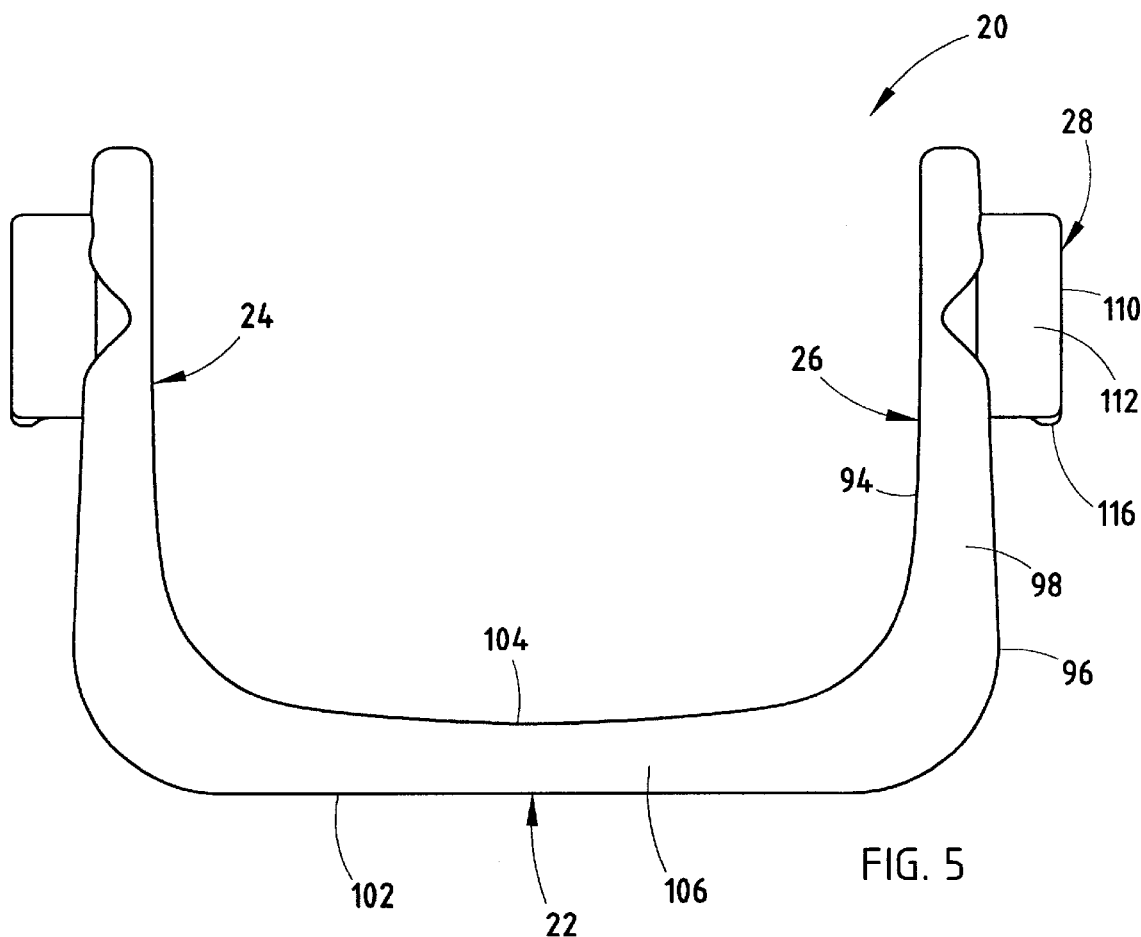
FIG. 5 is a top plan view of a flip-up bolster.
Figure 6:
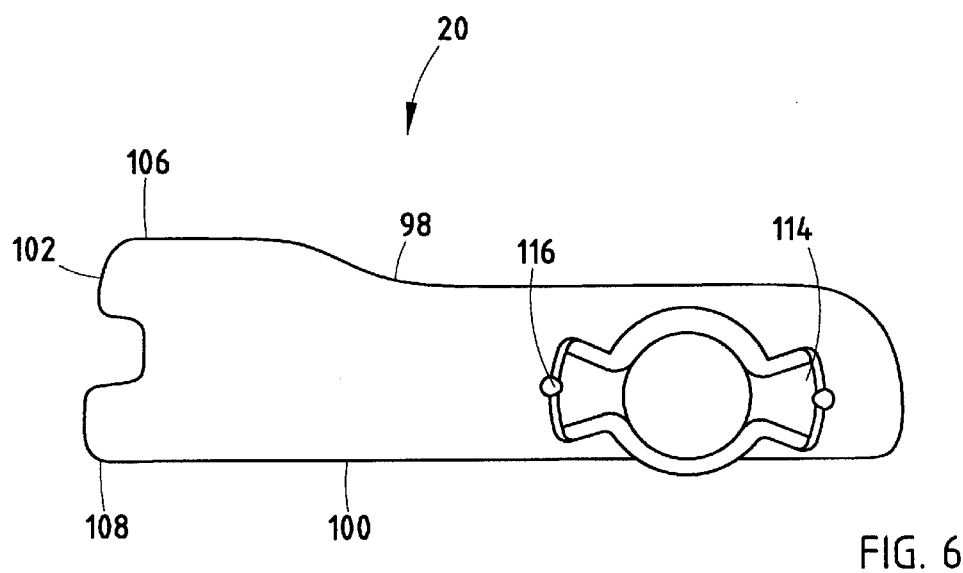
FIG. 6 is a side view of the flip-up bolster.

The bolster 20 (FIGS. 5 and 6) is rotatably received within seat section 14 and includes support section 22 and first and second arm sections 24 and 26. Each arm section 24 and 26 are defined by an inner surface 94, an outer surface 96, an upper surface 98 and a lower surface 100, and includes one of the second coupler portions 28. Support section 22 of bolster 20 is defined by a forward surface 102, a rearward surface 104, an upper surface 106, and a lower surface 108. The first and second arm sections 24 and 26 of bolster 20 are elastically longitudinally flexible such that the distance between second coupler portions 28 may be decreased.

In the illustrated example, bolster 20 is constructed from plastic or a material exhibiting similar properties. Bolster 20 is preferably formed through a blow-molding process, and has a substantially uniform wall thickness. Although a blow-molding process is preferred, it is foreseeable that any suitable method for hollow molding may be utilized.

Each second coupler portion 28 includes a circularly shaped boss 110 defined by a bearing surface 112. Each bearing surface 112 is adapted to ride along bearing surface 86 of first coupler portions 18, thereby allowing the bolster to be rotated between the lowered position A and the raised position B as described below. Each second coupler portion 28 further includes a pair of second stops 114 juxtaposed across boss 110. Each boss 110 and the associated second stops 114 cooperate to form a bow tie-like geometrical cross-sectional shape. Each second coupler portion 28 also includes a detent 16 extending radially outward from one of the second stops 14 of second coupler portion 28. Each detent 16 is adapted to cooperate with first and second notches 92 and 93 of first coupler portion 18 to lock bolster 20 in both the lowered position A and raised position B as described below.

Figure 7:
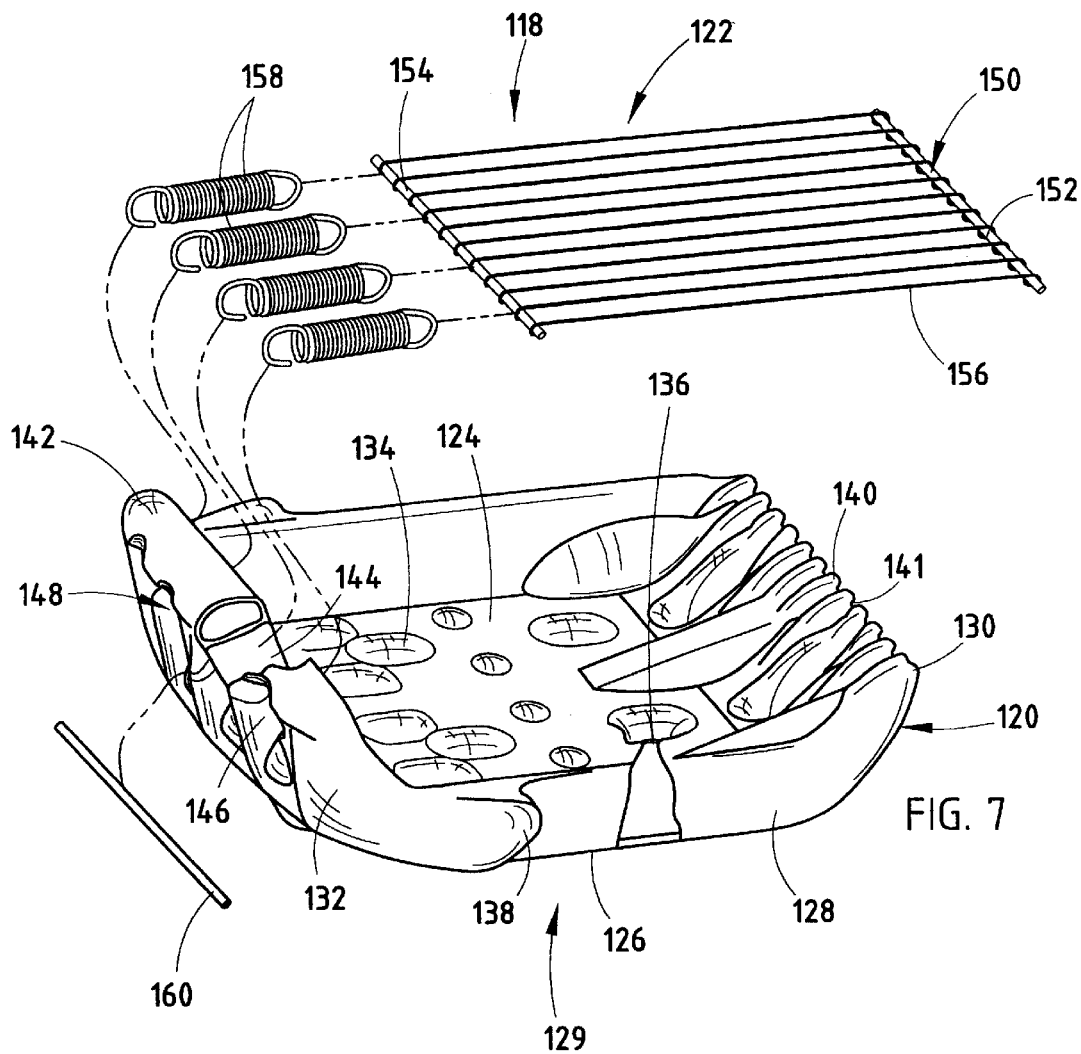
FIG. 7 is an exploded perspective view of a seat insert.
Figure 8:
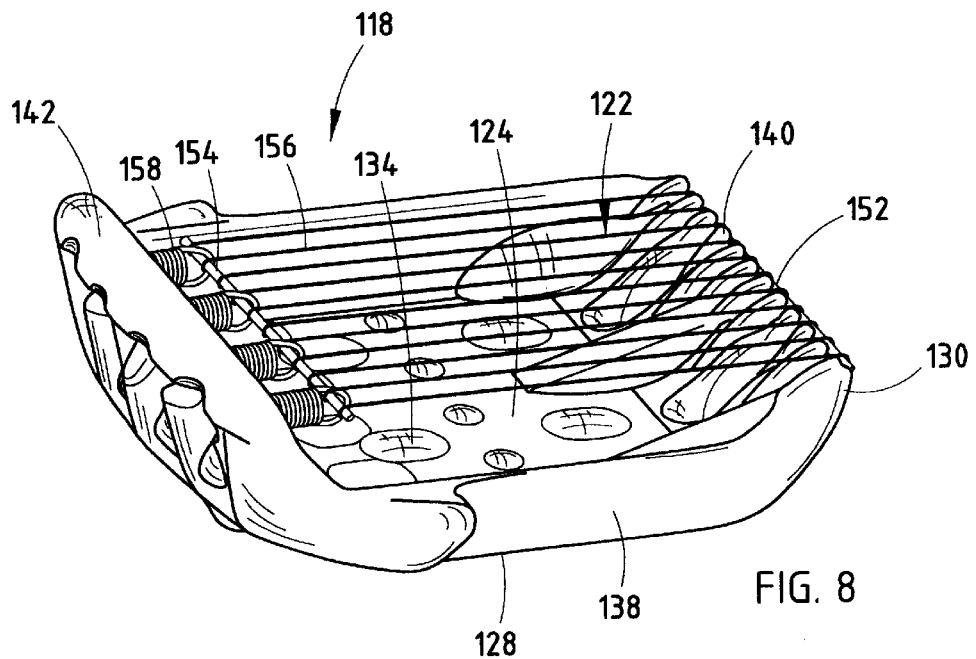
FIG. 8 is a perspective view of the seat insert.

The chair assembly 10 further includes a seat suspension insert 118 (FIGS. 7 and 8) that includes a hollow molded body section 120 (FIG. 7) that supports a suspension system 122. Body section 120 is defined by an upper surface 124, a bottom surface 126, side surfaces 128, a front side 130 and a rear side 132. Seat insert 118 is provided with plurality of reinforcement recesses 134 that extend between upper surface 124 and bottom surface 126, thus providing seat insert 118 structural rigidity against longitudinal and lateral warping, as well as oil-canning. Each reinforcement recess 134 is provided with an aperture 136 which is adapted to receive mounting hardware therein or therethrough as described below. Each side surface 128 is staggered to define a release area 129 which allows for clearance of arms 24 of bolster 20 when chair assembly 10 has been assembled. Front side 130 of seat insert 118 includes a plurality of forwardly extending engagement arms 140 each forming a recess 141 therein. Rear side 132 includes a raised rear portion 142 having a plurality of apertures 144 extending therethrough. Rear side 132 further includes a plurality of engagement arms 146 each forming a recess 148 therein.

In the illustrated example, body section 120 is constructed from plastic or a material exhibiting similar properties. Body section 120 is preferably formed through a blow-molded process, and has a substantially uniform wall thickness. Although a blow-molding process is preferred, it is foreseeable that any suitable method for hollow molding may be utilized.

The suspension system 122 includes suspension deck 150 that includes a front lateral member 152, a rear lateral member 154 and a plurality of longitudinally extending suspension members 156 extending between and attached to front lateral member 152 and rear lateral member 154. Suspension system 122 also includes a plurality of suspension springs 158 and a rear lateral member 160. In assembly, springs 158 are extended through apertures 144 of raised rear portion 142 and attached to rear lateral member 160 which is placed within recesses 148 of engagement arms 146. Springs 158 are then attached to rear lateral member 154 and front lateral member 142 is placed within recesses 141 of engagement arms 140, thereby suspending suspension system 122 above upper surface 124 of body section 120. In use, suspension system 122 supports a user thereon and dampens the forces exerted between the user and the seat section 14 of seat shell 12. Pressure equalization holes 61 within seat section 14 equalize the air pressure within chair 10 as the supervision system is compressed and decompressed by the use.

In assembly, bolster 20 is placed within seat shell 12 for rotation between lowered position A and raised position B. Specifically, arms 24 and 26 of bolster 20 are flexed longitudinally, thereby reducing the distance between bosses 110. Bolster 20 is then inserted within seat shell 12 such that bosses 110 are in contact with left and right sides 38 and 40 of arms 72. First and second coupler portions 18 and 28 are then coupled together by positioning bolster 20 with respect to seat shell 12 until bosses 110 of first coupler portions 18 are aligned with and engage apertures 84 of second coupler portions 28, thereby allowing arms 24 and 26 of bolster 20 to return to the unflexed position. The naturally unflexed position of arms 24 and 25 of bolster 20 provide for a positive engagement of each boss 110 of second coupler portion 28 within an associated aperture 84 of first coupler portions 18. Seat suspension insert 18 is then placed in position between arms 72 such that bottom surface 126 of seat insert 118 abuts upper surface 30 of seat section 14. When assembled, side surfaces 128 of body section 120 of seat insert 118 abut inner surface 94 of arms 24 and 26 of bolster 20, thereby assuring that arms 24 and 26 may not be flexed and preventing bosses 110 of second coupler portions 28 from being removed from within apertures 84 of first coupler portions 18.

In operation, bolster 20 is rotatable about pivot point 88 between lowered position A and raised position B. When in lowered position A, support section 22 of bolster 20 is located in the first position which is proximate seat section 14 of seat shell 12 and cooperates with and seat insert 18 to support a user thereon when the user is in a fully seated position. Further, detents 116 engage notches 92, thereby requiring the user to apply a rotational force to bolster 20 to rotate bolster 20 from position A towards position B. When in the raised position B, support section 22 of bolster 20 is raised to the second position above seat section 14 of seat shell 12 and seat insert 18, thereby providing an elevated seating surface on which to support the user. The elevated seating position provides and elevated seating surface and improved visibility when docking or maneuvering an associated vehicle such as a recreational boat and the like. It should further be noted that chair assembly 10 provides additional space between front edge 34 of seat section 14 and an associated console or steering wheel of an associated boat, within which to locate the user's legs. Further, detents 116 engage notches 93 when the seat is in raised position B, thereby requiring the user to apply a rotational force to bolster 20 to rotate bolster 20 from raised position B to lowered position A.

Figure 9:
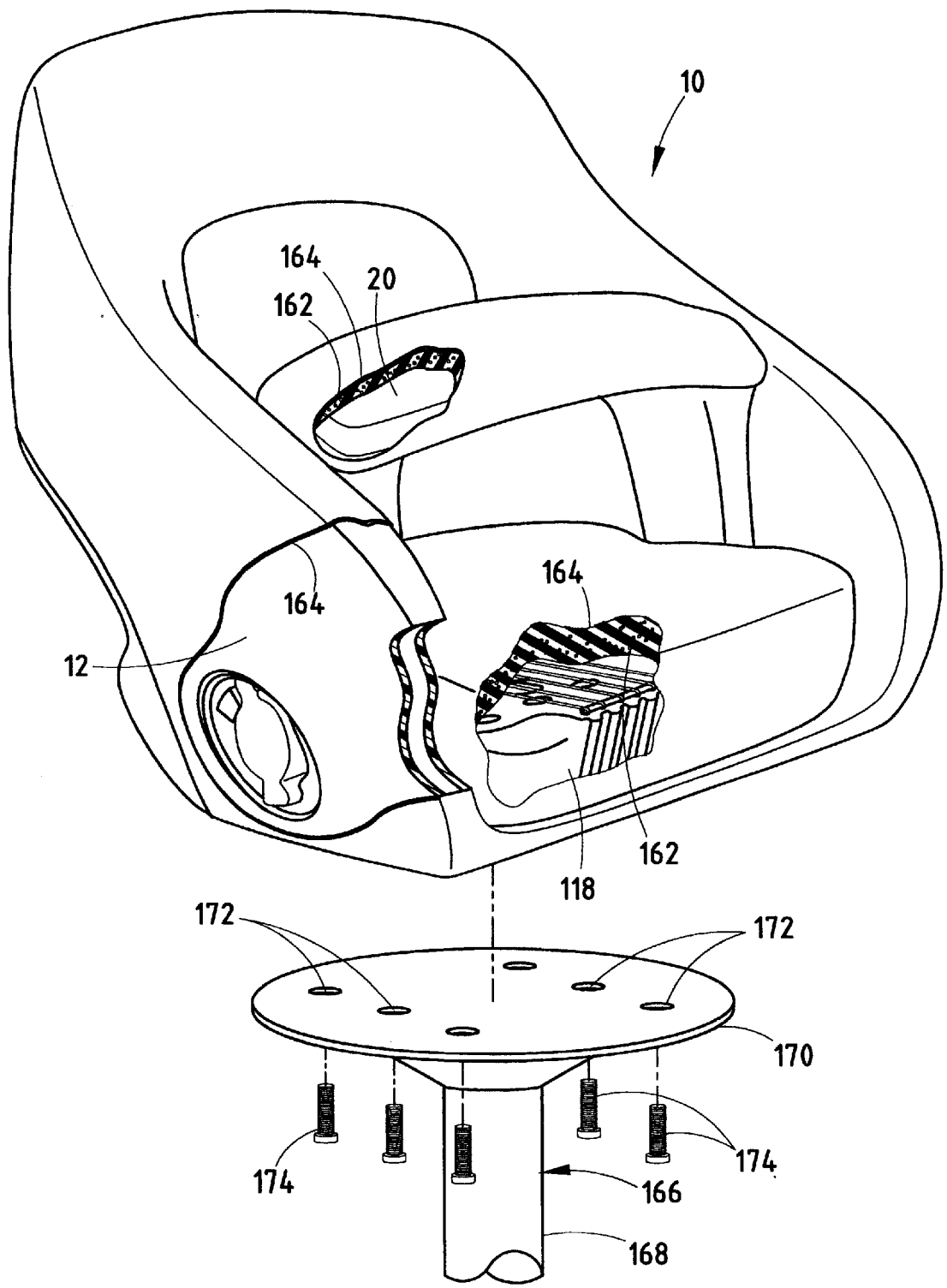
FIG. 9 is a perspective, cut-away view of the chair assembly and an associated pedestal assembly.

Referring to FIG. 9, seat shell 12, bolster 20 and seat insert 118 are each covered with a layer of foam material 162, which is subsequently covered with individual seat covers 164. Individual seat covers 164 are constructed of cloth, vinyl or other suitable material in the shape to slip over the individual components of the seat shell 12, bolster 20 and seat insert 18. The seat covers 164 may be held in place about seat shell 12, bolster 20, and seat insert 118 by those methods common in the art such as providing a drawstring, a zipper or J-channel, Velcro straps, or by stapling the seat covers 164 directly to the associated components. It should be noted that each individual component, including seat shell 12, bolster 20 and seat insert 118 may be constructed and covered with foam 162 and seat covers 164 prior to assembly of chair assembly 10.

As illustrated in FIG. 9, chair assembly 10 is preferably placed upon a pedestal assembly 166 that includes a pedestal 168 adapted to extend upwardly from a boat surface and the like, and a mounting plate 170 fixedly attached to pedestal 168. Specifically, chair assembly 110 is placed upon pedestal assembly 166 such that lower surface 32 of seat section 14 abuts mounting plate 170 of pedestal assembly 166. A plurality of bolts 174, or other appropriate mounting hardware, are extended upwardly through a plurality of apertures 172 located within mounting plate 170, through apertures 60 of seat section 74 and are matably received within apertures 136 of seat insert 118, thereby sandwiching seat section 14 of seat shell 12 between mounting plate 170 of pedestal assembly 166 and body section 120 of seat insert 118 and fixedly mounting chair assembly 110 to pedestal assembly 166. Other mounting hardware and fasteners, not shown, may be used in conjunction with bolts 174 by placing such hardware within body section 120 of seat insert 118 or by in-molding such hardware within body section 120.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A chair assembly, comprising:
   a seat shell including a seat section adapted to support a user thereon and a back section extending upwardly from the seat section, the seat shell further including a pair of first coupler portions, and
   a bolster including a support section, a first arm section and a second arm section, the first and second arm sections positioned on substantially opposite sides of the support section, each arm including a second coupler portion matable with the first coupler portions;
   wherein at least a select one of the first and second coupler portions are laterally flexible with respect to one another between a first position that allows for the first and second coupler portions to be coupled together and a second position that prevents the first and second coupler portions to be uncoupled from one another, and wherein the bolster is rotatable between a first position wherein the support section of the bolster is located at a first height with respect to the seat section of the seat shell and is positioned to support a user thereon, and a second position wherein the support section of the bolster is located at a second height with respect to the seat section of the seat shell and is above the first height.

2. The chair assembly of claim 1, wherein the seat shell further includes a pair of arms positioned on substantially opposite sides of the seat section, and wherein each arm includes one of the first coupler portions.

3. The chair assembly of claim 2, wherein each first coupler portions includes a circularly shaped aperture extending at least partially through the associated arm, and wherein each second coupler portions includes a circularly shaped boss adapted to be received within the apertures the first coupler portions and allow the bolster to be rotated between the first and second position by rotating the bosses of the second coupler portions within the apertures of the first coupler portions.

4. The chair assembly of claim 3, wherein each aperture of the first coupler portions includes at least one radially inward extending first stop, and wherein each boss of the second coupler portions includes at least one radially outward extending second stop that is adapted to abut the first stop, thereby limiting the range of rotation of the bolster to between the first position and the second position.

5. The chair assembly of claim 1, wherein the seat shell further includes a pair of arms located on substantially opposite sides of the seat section, and wherein each arm includes one of the first coupler portions.

6. The chair assembly of claim 5, wherein the first coupler includes a circularly shaped aperture extending at least partially through the associated arm, each aperture including at least one radially inward extending first stop each second coupler portions includes a circularly shaped boss adapted to be received within the apertures of the first coupler portions, and wherein each boss of the second coupler portions includes at least one radially outward extending second stop adapted to abut the first stop, thereby limiting the range of rotation of the bolster to between the first position and the second position.

7. The chair assembly in claim 1, wherein the seat shell is constructed of hollow moldable plastic.

8. The chair assembly in claim 1, wherein the bolster is constructed of hollow moldable plastic.

9. The chair assembly of claim 1, wherein the support section of the bolster is adapted to support a user thereon when the bolster is in the first position and the second position.

10. A chair assembly comprising:
    a seat shell including a seat section adapted to support a user thereon, a back section extending upwardly from the seat section, a pair of first coupler portions, and a pair of arms positioned on substantially opposite sides of the seat section, each arm including one of the first coupler portions, each first coupler portions including a circularly shaped aperture extending at least partially through the associated arm, each aperture of the first coupler portions including at least one radially inward extending first stop, and wherein each aperture of the first coupler portions includes a select one of a group consisting of at least one locking notch and at least one detent adapted to be received within the locking notch; and
    a bolster including a support section, a first arm section and a second arm section, the first and second arm sections positioned on substantially opposite sides of the support section, each arm including a second coupler portion matable with the first coupler portions wherein each second coupler portions includes a circularly shaped boss adapted to be received within the apertures the first coupler portions, each boss of the second coupler portions includes at least one radially outward extending second stop that is adapted to abut the first stop, and wherein each boss of the second coupler portions further includes the select one of the group consisting of the locking notch and the detent that is not included within the apertures of the first coupling portions; and
    wherein at least a select one of the first and second coupler portions are laterally flexible with respect to one another between a first position that allows for the first and second coupler portions to be coupled together and a second position that prevents the first and second coupler portions to be uncoupled from one another, the bolster is rotatable between a first position wherein the support section of the bolster is located at a first height with respect to the seat section of the seat shell, and a second position wherein the support section of the bolster is located at a second height with respect to the seat section of the seat shell and is above the first height, the circularly shaped aperture allows the bolster to be rotated between the first and second position by rotating the bosses of the second coupler portions within the apertures of the first coupler portions, the first and second stops limit the range of rotation of the bolster to between the first position and the second position, and wherein the detent engages the locking notch when the bolster is in the second position, therby requiring the user to exert a force on the bolster to rotate the bolster from the second position to the first position.

11. The chair assembly of claim 10, wherein at least one locking notch includes a first locking notch and a second locking notch, and wherein the detent engages the second locking notch when the bolster is in the first position, thereby requiring the user to exert a force on the bolster to rotate the bolster from the first position to the second position.

12. The chair assembly of claim 11, wherein the arm sections of the bolster are longitudinally flexible thereby providing for the lateral flexibility of the second coupler portions with respect to one another.

13. The chair assembly of claim 12, further including:
a seat insert adapted to be received upon the seat section and between the arms of the seat shell, wherein the seat insert abuts the bolster arms, thereby preventing the first and second coupler portions to be uncoupled from one another.

14. The chair assembly of claim 13, wherein the seat shell is constructed of hollow moldable plastic.

15. The chair assembly of claim 14, wherein the bolster is constructed of hollow moldable plastic.

16. A chair assembly, comprising:
a seat shell including a seat section adapted to support a user thereon, a back section extending upwardly from the seat section, a pair of first coupler portions, and a pair of arms positioned on substantially opposite sides of the seat section, each arm including one of the first coupler portions, and wherein each first coupler portions includes a circularly shaped aperture extending at least partially through the associated arm; and
a bolster including a support section, a first arm section and a second arm section, the first and second arm sections positioned on substantially opposite sides of the support section, each arm including a second coupler portion matable with the first coupler portions, wherein each second coupler portions includes a circularly shaped boss adapted to be received within the apertures of the first coupler portions; and
wherein the arms of the bolster are flexible between an unflexed position wherein the bosses of the second coupler portions define a first distance between one another, and a flexed position wherein the bosses define a second distance between one another that is less than the first distance, therby allowing the first and second coupler portion, aligning the bosses of the second coupler portions with the apertures of the first coupler portions, and returning the arms of the bolster to the unflexed position, and wherein the bolster is rotatable between a first position wherein the support section of the bolster is located at a first height with respect to the seat section of the seat shell, and a second position wherein the support section of the bolster is located at a second height with respect to the seat section of the seat shell and is above the first height.

17. A chair assembly comprising:
a seat shell including a seat section adapted to support a user thereon, a back section extending upwardly from the seat section, a pair of first coupler portions, and a pair of arms positioned on substantially opposite sides of the seat section, and wherein each arm includes one of the first coupler portions, the first coupler includes a circularly shaped aperture extending at least partially through the associated arm, each aperture includes at least one radially inward extending first stop, and wherein at least one first stop of the first coupler portions includes two first stops positioned on substantially opposite sides of each aperture; and
a bolster including a support section, a first arm section and a second arm section, the first and second arm sections positioned on substantially opposite sides of the support section, each arm including a second coupler portion matable with the first coupler portions, wherein each second coupler portion includes a circularly shaped boss adapted to be received within the apertures of the first coupler portions, and wherein each boss of the second coupler portions includes at least one radially outward extending second stop adapted to abut the first stop, and wherein at least one second stop of the second coupler portions includes two second stops positioned on substantially opposite sides of each boss; and
wherein at least a select one of the first and second coupler portions are laterally flexible with respect to one another between a first position that allows for the first and second coupler portions to be coupled together, and a second position that prevents the first and second coupler portions to be uncoupled from one another, the bolster is rotatable between a first position wherein the support section of the bolster is located at a first height with respect to the seat section of the seat shell, and a second position wherein the support section of the bolster is located at a second height with respect to the seat section of the seat shell and is above the first height, and wherein the first and second stops limit the range of rotation of the bolster to between the first position and the second position.

18. The chair assembly of claim 17, wherein each boss and associated first stops have a bow-tie cross-sectional shape.

19. A chair assembly, comprising:
a seat shell including a seat section adapted to support a user thereon, a back section extending upwardly from the seat section, and a pair of first coupler portions, wherein each first coupler portions includes a circularly shaped aperture that includes a select one of a group consisting of at least one locking notch and at least one detent adapted to be received within the locking notch; and
a bolster including a support section, a first arm section and a second arm section, the first and second arm sections positioned on substantially opposite sides of the support section, each arm including a second coupler portion matable with the first coupler portions, wherein each second coupler portion includes a circularly shaped boss received within the apertures of each first coupler portions, and wherein each boss includes the select one of the group consisting of the locking notch and the detent that is not included within the apertures; and
wherein at least a select one of the first and second coupler portions are laterally flexible with respect to one another between a first position that allows for the first and second coupler portions to be coupled together, and a second position that prevents the first and second coupler portions to be uncoupled from one another, the bolster is rotatable between a first position wherein the support section of the bolster is located at a first height with respect to the seat section of the seat shell, and a second position wherein the support section of the bolster is located at a second height with respect to the seat section of the seat shell and is above the first height, and wherein the detent engages the locking notch when the bolster is in the second position, thereby requiring the user to exert a force on the bolster to rotate the bolster from the second position to the first position.

20. The chair assembly in claim 19, wherein at least one locking notch includes a first locking notch and second locking notch, and wherein the detent engages the second locking notch when the bolster is in the first position, therby requiring the user to exert a force on the bolster to rotate the bolster from the first position to the second position.

21. A chair assembly, comprising:
   a seat shell including a substantially hollow seat section adapted to support a user thereon and a substantially hollow back section extending upwardly from the seat section, the seat shell including a first coupler portion; and
   a bolster including a substantially hollow support section, a pair of substantially hollow arms positioned at opposite ends of the support section, and a second coupler portion coupled to the first coupler portion; and
   wherein the bolster is rotatable between a first position wherein the support section of the bolster is at a first height relative to the seat section of the seat shell and is positioned to support a user thereon, and a second position wherein the support section of the bolster is at a second height relative to the seat section of the seat shell and is above the first height.

22. The chair assembly of claim 21, wherein the seat shell is constructed of a rotocast plastic.

23. The chair assembly of claim 22, wherein the bolster is constructed of a blow-molded plastic.

24. The chair assembly of claim 21, wherein the first coupler portion includes a pair of apertures and the second coupler portion includes a pair of bosses received with the apertures of the first coupler portion.

25. The chair assembly of claim 24, wherein each aperture of the first coupler portions includes at least one radially inward extending first stop, and wherein each boss of the second coupler portions includes at least one radially outward extending second stop that is adapted to abut the first stop, thereby limiting the range of rotation of the bolster to between the first position and the second position.

26. A chair assembly, comprising:
   a seat shell including a substantially hollow seat section adapted to support a user thereon, a substantially hollow back section extending upwardly from the seat section, and a first coupler portion;
   a bolster including a substantially hollow support section, a pair of substantially hollow arms, and a second coupler portion coupled to the first coupler portion; and
   a seat insert supported on the seat section of the seat shell and abutting at least a select one of the first coupler portion and the second coupler portion, thereby preventing the first and second coupler portions from being uncoupled from one another; and
   wherein the bolster is rotatable between a first position wherein the support section of the bolster is at a first height relative to the seat section of the seat shell, and a second position wherein the support section of the bolster is at a second height relative to the seat section of the seat shell and is above the first height.

27. The chair assembly of claim 26, wherein the seat insert includes a substantially hollow body section.

28. The chair assembly of claim 27, wherein the body section of the seat insert is constructed of a blow-molded plastic.

29. The chair assembly of claim 26, wherein the seat insert includes a suspension system adapted to support the user thereon and to dampen forces exerted between the chair to the user.

30. A chair assembly, comprising:
   a seat shell including a substantially hollow seat section adapted to support a user thereon, a substantially hollow back section extending upwardly from the seat section, a first coupler portion that includes a pair of apertures, and a pair of arm sections positioned on substantially opposite sides of the seat section, each arm including one of the apertures of the first coupler portion therein; and
   a bolster including a substantially hollow support section, a pair of substantially hollow arms, and a second coupler portion coupled to the first coupler portion, the second coupler portion including a pair of bosses received within the apertures of the first coupler portion, each bolster including one of the bosses thereon, and wherein each bolster arm is flexible between a flexed position that defines a first distance between the bosses and allows the bosses to be into axial alignment with the apertures, and an unflexed position that defines a second distance between the bosses greater than the first distance and prevents the bosses from being removed from axial alignment with the apertures; and
   wherein the bolster is rotatable between a first position wherein the support section of the bolster is at a first height relative to the seat section of the seat shell, and a second position wherein the support section of the bolster is at a second height relative to the seat section of the seat shell and is above the first height.

31. The chair assembly of claim 30, further including:
   a seat insert supported by the seat section of the seat shell, wherein the seat insert abuts the bolster arms, thereby preventing the flexure of the bolster arms from the unflexed position to the flexed position and preventing the first and second coupler portions from being uncoupled from one another.

32. A chair assembly, comprising:
   a seat shell including a substantially hollow seat section adapted to support a user thereon, a substantially hollow back section extending upwardly from the seat section, and a first coupler portion that includes a pair of apertures, each aperture of the first coupler portions including a select one of a group consisting of at least one locking notch and at least one detent adapted to be received within the locking notch; and
   a bolster including a substantially hollow support section, a pair of substantially hollow arms, and a second coupler portion coupled to the first coupler portion, the second coupler portion including a pair of bosses received with the apertures of the first coupler portion, each boss of the second coupler portions further including the select one of the group consisting of the locking notch and the detent that is not included within the apertures of the first coupling portions; and
   wherein the bolster is rotatable between a first position wherein the support section of the bolster is at a first height relative to the seat section of the seat shell, and a second position wherein the support section of the bolster is at a second height relative to the seat section of the seat shell and is above the first height, and wherein the detent engages the locking notch when the bolster is in the second position, thereby requiring the user to exert a force on the bolster to rotate the bolster from the second position to the first position.

33. The chair assembly of claim 32, wherein at least one locking notch includes a first locking notch and second locking notch, and wherein the detent engages the second locking notch when the bolster is in the first position, thereby requiring the user to exert a force on the bolster to rotate the bolster from the first position to the second position.

34. A method for constructing a chair, comprising:

providing a seat shell that includes a seat section, a back section extending upwardly therefrom, and a pair of first coupler portions;

providing a bolster that that includes a support section and a pair of longitudinally flexible supporting arms, each supporting arm including a second coupler portion and defining a distance therebetween;

placing a flexure force on the supporting arms, thereby elastically deforming the supporting arms and decreasing the distance between the second coupler portions;

aligning the first and second coupler portions; and releasing the flexure force on the supporting arms, thereby allowing the first and second coupler portions to positively engage, such that the bolster is rotatable between a first position, wherein the support section of the bolster is at a first height relative to the seat section of the seat shell, and a second position, wherein the support section of the bolster is located at a second height relative to the seat section of the seat shell and is above the first height.

35. The method of claim 34, further including:

providing a seat insert adapted to be supported by the seat section and to engage a select one of a group consisting of the first coupler portions and the second coupler portions, thereby preventing the first and second coupler portions from being uncoupled from one another; and securing the seat insert onto the seat shell such that the first and second coupler positions are prevented from uncoupling from one another.

36. The method of claim 35, wherein each first coupler portion includes a circularly shaped aperture and each second coupler portion includes a circularly shaped boss, the seat shell includes a pair of arms positioned on substantially opposite sides of the seat section, and wherein the step of aligning the first and second coupler portions includes axially aligning the bosses with the apertures.

37. The method of claim 36, further including:

providing a support pedestal adapted to support the seat shell above a surface, the support pedestal including a pedestal and a supporting surface fixedly attached to an end of the pedestal;

wherein the step of securing the seat insert onto the seat shell includes extending at least one securing device through the supporting surface of the pedestal and seat section of the seat shell, and positively engaging the seat insert with the securing device, thereby securing the seat section between the supporting surface and the seat insert.

38. The method of claim 34, wherein the seat shell providing step includes forming the seat shell such that the seat shell is substantially hollow.

39. The method of claim 38, wherein the seat shell providing step includes rotocasting the seat shell.

40. The method of claim 34, wherein the seat insert providing step includes forming the seat insert such that the seat insert is substantially hollow.

41. The method of claim 40, wherein the seat insert providing step includes blow-molding the seat insert.

42. The method of claim 34, wherein the bolster providing step includes forming the bolster such that the bolster is substantially hollow.

43. The method of claim 42, wherein the bolster providing step includes blow-molding the bolster.

* * * * *

UNITED STATES PATENT AND TRADEMARK OFFICE
CERTIFICATE OF CORRECTION

PATENT NO. : 6,474,738 B1
DATED : November 5, 2002
INVENTOR(S) : Ratza et al.

It is certified that error appears in the above-identified patent and that said Letters Patent is hereby corrected as shown below:

Column 2,
Line 6, "define" should be -- defines --.
Line 43, "cut-away" should be -- cut away --.

Column 3,
Line 18, "are" should be -- is --.

Column 6,
Line 16, after "with" delete "and".
Line 25, "and" should be -- an --.

Column 7,
Lines 40, 42 and 63, "portions" should be -- portion --.

Column 8,
Lines 17 and 31, "portions" should be -- portion --.
Line 33, after "apertures" insert -- of --.
Line 54, "position" should be -- positions --.

Column 9,
Lines 24, 25 and 33, "portions" should be -- portion --.
Line 41, "therby" should be -- thereby --.
Line 42, "portion" should be -- portions --.
Line 42, after "portion(s)" insert -- to be snappingly mated by flexing the arms of the bolster from the unflexed position to the flexed position, --.

Column 10,
Line 33, "portions" should be -- portion --.
Line 45, "portions" should be -- portion --.

UNITED STATES PATENT AND TRADEMARK OFFICE
CERTIFICATE OF CORRECTION

PATENT NO.   : 6,474,738 B1
DATED        : November 5, 2002
INVENTOR(S)  : Ratza et al.

It is certified that error appears in the above-identified patent and that said Letters Patent is hereby corrected as shown below:

Column 12,
Line 46, "with" should be -- within --.

Column 13,
Line 5, delete "that" (second occurrence).

Signed and Sealed this

Eleventh Day of March, 2003

JAMES E. ROGAN
*Director of the United States Patent and Trademark Office*